United States Patent
Reynolds et al.

(10) Patent No.: US 6,795,158 B1
(45) Date of Patent: Sep. 21, 2004

(54) REAL TIME ANSWERPRINT TIMING SYSTEM AND METHOD

(75) Inventors: Timothy G. Reynolds, Chatsworth, CA (US); Harold L. Rattray, North Hollywood, CA (US)

(73) Assignee: Technicolor, Inc., North Hollywood, CA (US)

( * ) Notice: Subject to any disclaimer, the term of this patent is extended or adjusted under 35 U.S.C. 154(b) by 0 days.

(21) Appl. No.: 10/115,657

(22) Filed: Apr. 3, 2002

(51) Int. Cl.[7] .......................... G03B 21/32; G03B 1/00
(52) U.S. Cl. .......................... 352/41; 352/42; 352/166
(58) Field of Search .................... 352/41, 42, 166, 352/167, 198, 205; 345/723

(56) References Cited

U.S. PATENT DOCUMENTS

| | | | |
|---|---|---|---|
| 3,610,815 A | * | 10/1971 | Gould et al. ............. 348/586 |
| 3,708,797 A | | 1/1973 | Solomon et al. |
| 3,752,577 A | | 8/1973 | Grossetete et al. |
| 3,818,216 A | * | 6/1974 | Larraburu ............. 362/301 |
| 3,824,336 A | | 7/1974 | Gould et al. |
| 4,108,537 A | | 8/1978 | Watson et al. |
| 4,127,322 A | | 11/1978 | Jacobson et al. |
| 4,174,173 A | | 11/1979 | Pone, Jr. |
| 4,408,838 A | | 10/1983 | Factor |
| 4,410,908 A | * | 10/1983 | Belmares-Sarabia et al. .... 348/661 |
| 4,422,753 A | | 12/1983 | Pryor |
| 4,488,807 A | | 12/1984 | Watson |
| 4,629,298 A | | 12/1986 | Trumbull et al. |
| 4,740,812 A | | 4/1988 | Pryor |
| 5,010,414 A | | 4/1991 | Clapp |
| RE34,169 E | * | 1/1993 | Osburn et al. ............. 348/645 |
| 5,241,407 A | | 8/1993 | Sonehara et al. |
| 5,412,773 A | | 5/1995 | Carlucci et al. |
| 5,528,339 A | | 6/1996 | Buhr et al. |
| 5,610,687 A | | 3/1997 | Bogdanowicz et al. |
| 5,687,011 A | | 11/1997 | Mowry |
| 5,745,218 A | | 4/1998 | Sugahara et al. |
| 5,841,512 A | | 11/1998 | Goodhill |
| 5,982,379 A | | 11/1999 | Suzuki et al. |
| RE36,725 E | | 6/2000 | Sonehara et al. |
| 6,299,312 B1 | | 10/2001 | Choi et al. |

* cited by examiner

Primary Examiner—Rodney Fuller
(74) Attorney, Agent, or Firm—Joseph S. Tripoli; Francis A. Davenport; Samuel B. Stone

(57) ABSTRACT

A method and system for color correcting and completing answerprints in preparation for making final copies of motion pictures for distribution. A light system is provided in which colors of the light projected through a film toward a viewing screen can be individually and incrementally adjusted as desired for use by a color "Timer" who is an individual that selects color corrections on a scene-by-scene basis until a suitable look is achieved. The Timer does this in real time while watching the film scene projected on the screen. The color adjustments are stored and subsequently used to control a motion picture film printer in printing a next version of scenes of the film.

18 Claims, 5 Drawing Sheets

REAL TIME ANSWERPRINT TIMING SYSTEM AND METHOD

The present invention relates to scene to scene color correction of motion picture film preparatory to making final copies, called release prints, to be distributed to theaters and the like. More particularly, it relates to a new method and system for color correcting and completing answerprints in a more efficient and faster manner.

BACKGROUND OF THE INVENTION

Significant advances have been made over the years in the production of motion picture films. Today, scenes are printed on motion picture film, although some systems record on videotape. Still, the preferred method is film. A typical motion picture is made up of many daily film shots or scenes referred to as "dailies," from which workprints are made. These workprints are used to make answerprints which in turn are used during the color correction of scenes in the film. The numerous corrected scenes are ultimately assembled together for production of the final positive film prints called release prints for distribution to theaters and the like.

Of the various artistic aspects in the production of a motion picture film is color correction. Movie scenes are taken under different lighting conditions, on different days, in different locations, and the like. As a result, the colors may vary substantially from scene to scene which is undesirable in a final print. Additionally, some producers and directors may desire a given "mood" to a scene or scenes, such as darker, lighter, warmer (e.g. add red), more blue, less magenta and so on. Color correction currently is performed mainly in two ways.

The first way is frequently referred to as an answerprint timing process which involves individuals referred to as color "Timers" who work with customers to determine the look they would like for each and every scene of a film. The process continues until all of the cuts, transitions, sequences from film reel to film reel appear to have been shot simultaneously, uninterrupted and seamless throughout. The current hardware available for this process usually includes a pair of timing stations which comprise film strip projectors whereby the Timer can roll through a film and stop and evaluate each scene. Currently, one must rely on the experience and the "eye" of the color Timer to determine the amount of correction each scene needs. The various correction values are stored and used to control a film printer in making a new film print for further review and analysis by the Timer. The accuracy of their assessment, unfortunately, is not realized until the next time the negative is printed and developed using the values the Timer has chosen. This whole process usually needs to be repeated several times until all of the scenes in the film have the look that the Timer and the customer desire. As will be appreciated, each of the iterations uses time and resources as well as places additional wear and tear on the film negative.

Another approach to color correction involves recording the scenes in the video domain and viewing the scenes un a color video monitor. As the scenes are viewed, the electronics of the video system can be adjusted to vary the color according to the desires of the Timer. The color changes made are stored electronically and then used to control the film printer in printing a new copy also referred to as an answerprint. This print then is viewed to determine if the color corrections have been made satisfactorily, and to again enable color adjustments in the video domain, followed by the production of another print for further evaluation. Although this system and process allows adjustment and real time viewing of color changes, the actual results on film are still unknown until another new film print has been made and viewed because of the differences in color rendition via film versus video on a color monitor.

FIG. 1 is a flow chart which generally illustrates prior methods of answerprint timing wherein the Timer is the "operator," and is generally the same for either of the prior two methods discussed above

SUMMARY OF THE INVENTION

The system and method of the present invention involve a new approach to color correction. Basically, the film, referred to as an answerprint, is projected onto a conventional viewing screen through the use of a light system in which the colors of the light projected through the film toward the screen can be individually and incrementally adjusted by the Timer. If the look is not as the Timer desires, color, density and the like can be changed and the results seen immediately on the screen. The adjustments are stored electronically and used to make the next film print. This process is repeated for each of the scenes in a roll of film. As a result, the film printing process is instantly simulated and the Timer can see the results of the changes and therefore a great deal of time and money can be saved. This system and method are significantly different from the current answerprint timing process which does not allow the Timer to view the color changes in real time and also differs from the video system which, although it allows changes to be seen in real time in the video domain, the Timer still does not know what the color changes in the film will look like until a new print is made. It will be apparent that seeing the actual projected changes via controlled light through the film onto a viewer's screen is better and more accurate than viewing changes on a video monitor.

In accordance with an embodiment of the present invention, a color correcting "vane house" and lamp house of the type used in a standard optical film printer are used as the light source for projecting the film onto a screen. This type of vane house comprises narrowband dichroic light filters, and the entire visible light spectrum is broken down into three separate color paths, of red, green and blue. This is what is done in conventional film printing and the resulting colored light is merely used to print unexposed film, not project any film image. However, the vane house includes light valves within each color path, and these valves are used to control the amount of each individual color being projected to the viewing screen. This "color corrected" light of each of the colors is recombined and used to project the answerprint film onto the screen for scene-by-scene and/or frame-by-frame evaluation by the Timer.

An exemplary vane house has three light valves, each of which has a range of seventy-six steps called "light points" to control the amount of each color. The vanes are controlled electronically, and typically a position command to each of these light valves is a twelve bit digital signal. These commands can be provided from an associated computer or other suitable control system. Accordingly, as the Timer, who is considered to be the color expert, enters the value desired to be used to correct each of the three colors for any given scene, that information will now go into the present system and be stored, as well as control the light projected through the film so that the Timer can see in real time what those correction values look like. Then, if the look is not as the Timer desires the value can be changed in real time and the result seen on the screen immediately. Once the Timer is satisfied with the result, the data corresponding to the changes of each light valve, and consequently the resulting color changes, for each scene is electronically saved, and this data is used to control printing of the next print. As noted earlier, this process is repeated for each of the scenes in a roll of film, and from roll to roll. Thus, by instantly simulating the printing process, a great deal of time and money can be saved in completing the color correction of a motion picture film.

In the typical vane house, the light valves are mechanical "bam door" type devices and the vanes thereof are driven by servo motors. The concepts of the present invention also contemplate the use of other light and color controlling devices such as other optical, electronic and/or semiconductor light valves.

Accordingly, it is an object of the present invention to provide an improved real time answerprint timing system.

Another object of the present invention is to provide an improved real time answerprint timing method.

These and other objects and features of the present invention will become better understood through a consideration of the following description taken in conjunction with the drawings in which:

DETAILED DESCRIPTION

Figure 1:
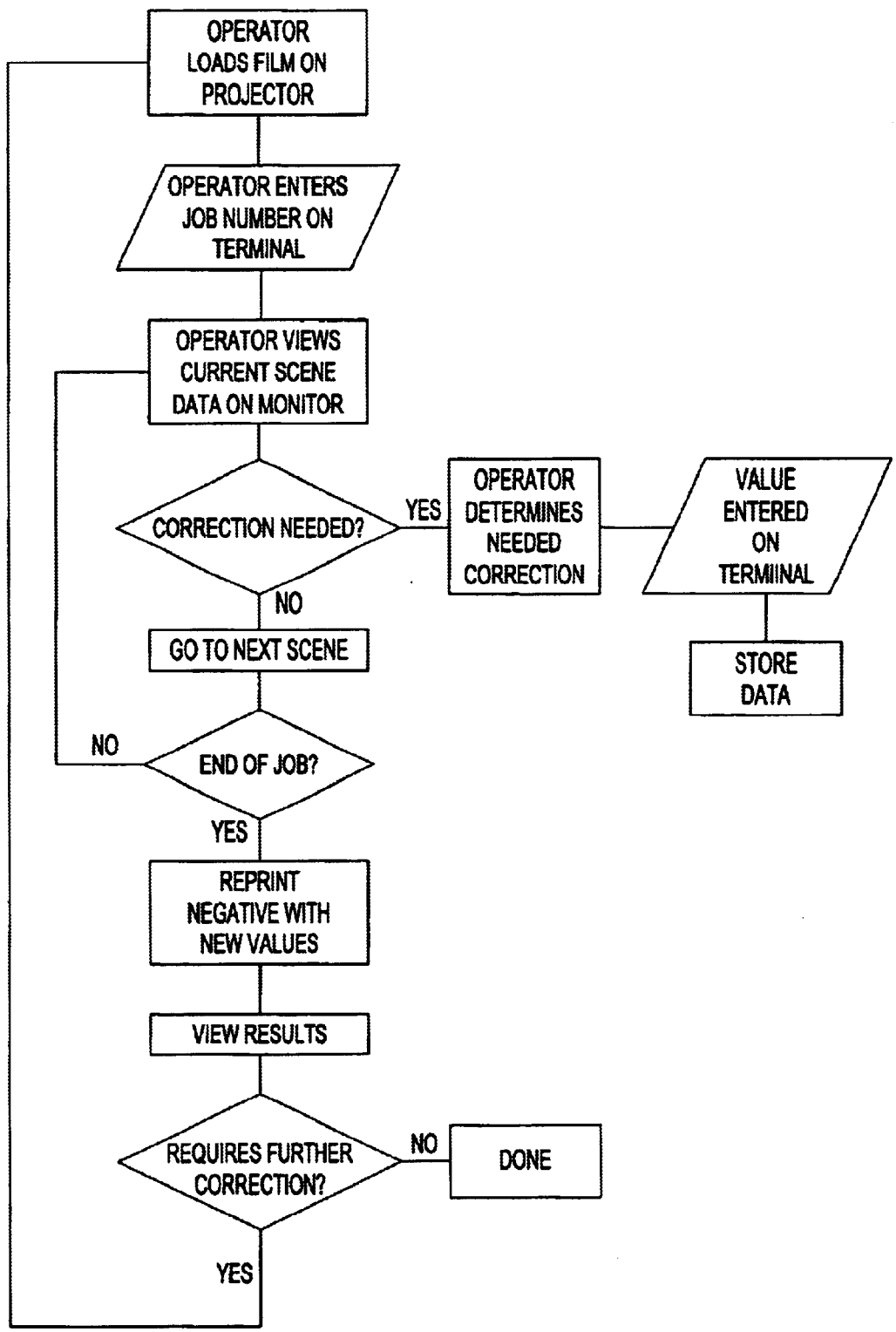
FIG. 1 is a flow chart illustrating the existing or prior art method of answerprint timing and illustrates the various steps in the process of completing film color correction.
Figure 2:
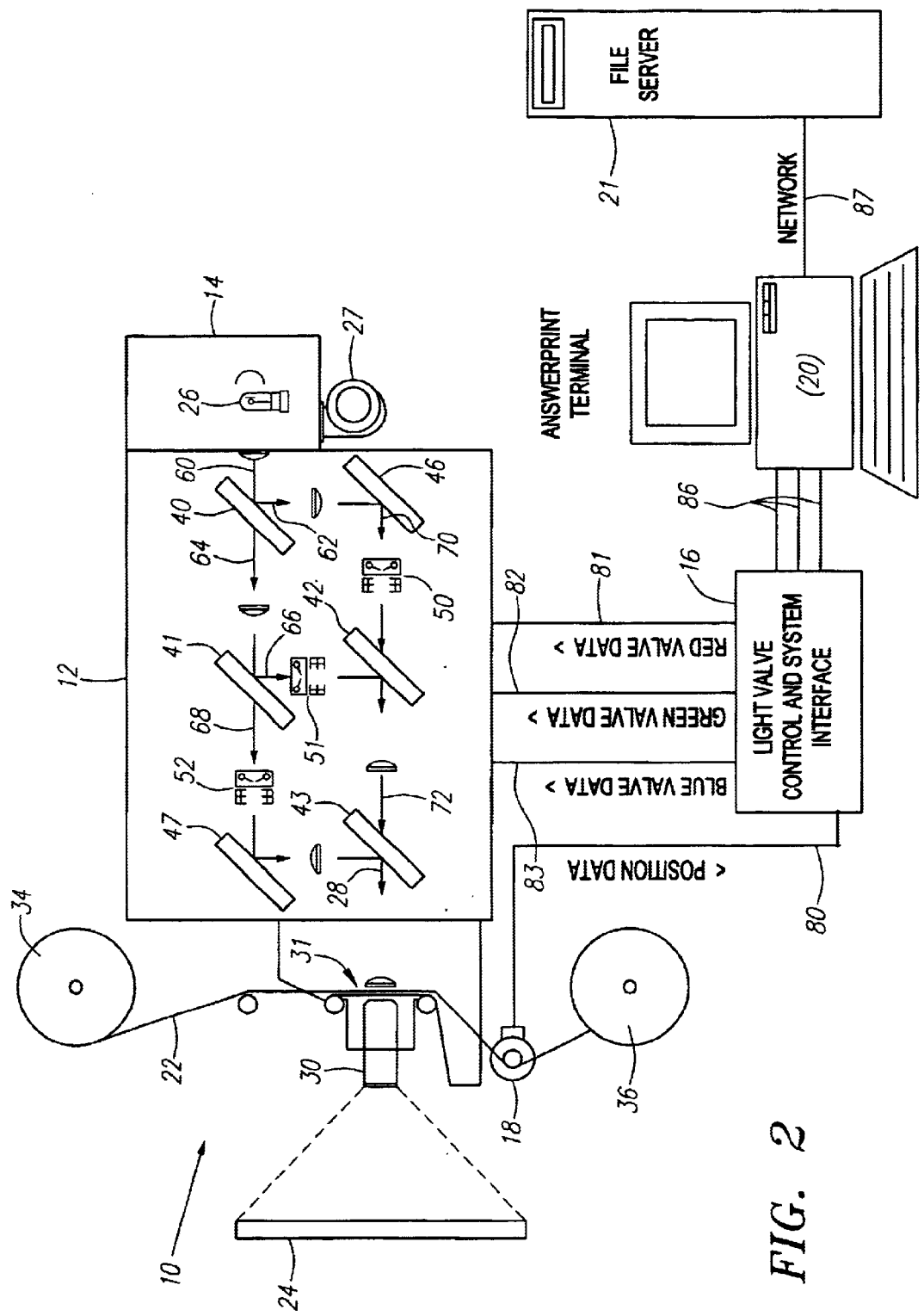
FIG. 2 illustrates an exemplary answerprint timing system according to the present invention.

Turning now to the drawings and first to FIG. 2, an exemplary real time answerprint timing system is illustrated and comprises a film strip projector 10, a color control unit such as an optical printer vane house 12, and a lamp house 14. The system further includes an interface computer 16, film position encoder 18, and main answerprint computer terminal 20 with a file server 21 or other suitable storage system. The lamp house 14 provides a source of white light, and the vane house 12 includes optics for modifying the color of the light from the lamp house which is ultimately projected through film 22 via the projector 10 to a screen 24. The lamp house has a cooling fan 27. The interface computer receives light valve color correction data usually input by the Timer for a current scene, and the position encoder 18 provides information about film 22 position to keep track of frames and views. The interface computer 16 provides this information to the computer 20 which, in turn, uses this information in later controlling a standard film printer in controlling color in printing a new answerprint as will be discussed later.

The vane house 12 and lamp house 14 are conventional in an optical film printer. The lamp house 14 includes a high wattage lamp 26, typically a Tungsten Halogen 1200 watt lamp, but may be replaced with a more powerful lamp source if the system is to be used with a larger screen 24. The vane house 12 is used to modify the color of the light source, and the optics, filters and light valves thereof are conventional to produce a color controlled light beam 28 for the film projector 10. The optics and filters preferably are narrowband dichroic light filters.

The film projector 10 is a conventional projector with a standard lens 30, film gate and optics; however, the usual lamp section of the projector 10 is removed and the vane house 12 and lamp house 14 are used instead. The light beam 28 from the vane house 12 is projected through the film 22, and the resulting images are projected via the projection optics 30 onto the projection screen 24. The film 22 is fed from a reel 34 and taken up by a take-up reel 36.

The film 22 passes over the position encoder 18 so as to provide frame-by-frame position data 80 to the computer 20. In this way, the system is able to keep track of each frame and scene which is important because color changes may be made frame-by-frame or scene-by-scene and, accordingly, the frame and/or scene information along with the color values need to be sensed and provided to the answerprint computer 20 for ultimate control of film printing. Thus, the interface computer 16 is used to receive the light valve data (color correction) values for each frame and/or scene and to provide that information from the encoder 18, along with the film position information, to the main answerprint computer 20. The data from the answerprint computer 20 is used to control the conventional film printer (not shown) in printing a new answerprint with the selected color changes via a network or other data transfer 87.

Turning again to the vane house 12, the same includes a number of narrowband dichroic light filters 40, 41, 42 and 43, front surface mirrors 46 and 47, and three optical light valve assemblies 50, 51 and 52 which can include light vanes to vary the level of light passed thereby or other forms of light valves as noted earlier. As is known, light beam 60 from the lamp house 14 is first directed to dichroic filter 40 which (1) reflects red light 62 and (2) passes light in the cyan spectrum at 64 to a second dichroic filter 41 which (1) reflects green light 66 and (2) passes blue light 68. The red light beam 62 is reflected by the mirror 46 as beam 70 to a red dichroic filter 42. The green light beam 66 is reflected by filter 42 and combined with the red light 70 to provide a yellow beam 72 to the dichroic filter 43. The blue light beam 68 is reflected by front surface mirror 47 to filter 43, resulting in the color controlled output beam 28 made up of various values of red, green and blue light, and this resulting light beam is passed through the film gate 31, film 22, and projection lens 30 to project the film images onto the viewing screen 24.

The light valves 50, 51 and 52 individually and incrementally control the amount of each of the colored beams passed thereby. The respective settings as directed by data paths 81 through 83 to the respective valves 50, 51 and 52 are sent via signal path 86 to the main answerprint computer 20 and stored therein. These stored values are stored later to set up the light valves in the film printer (not shown) along with film position data 80 from the encoder 18 via the interface 16 so as to property set the colors for each scene and/or each frame as the next answerprint is made by the film printer.

Figure 3:
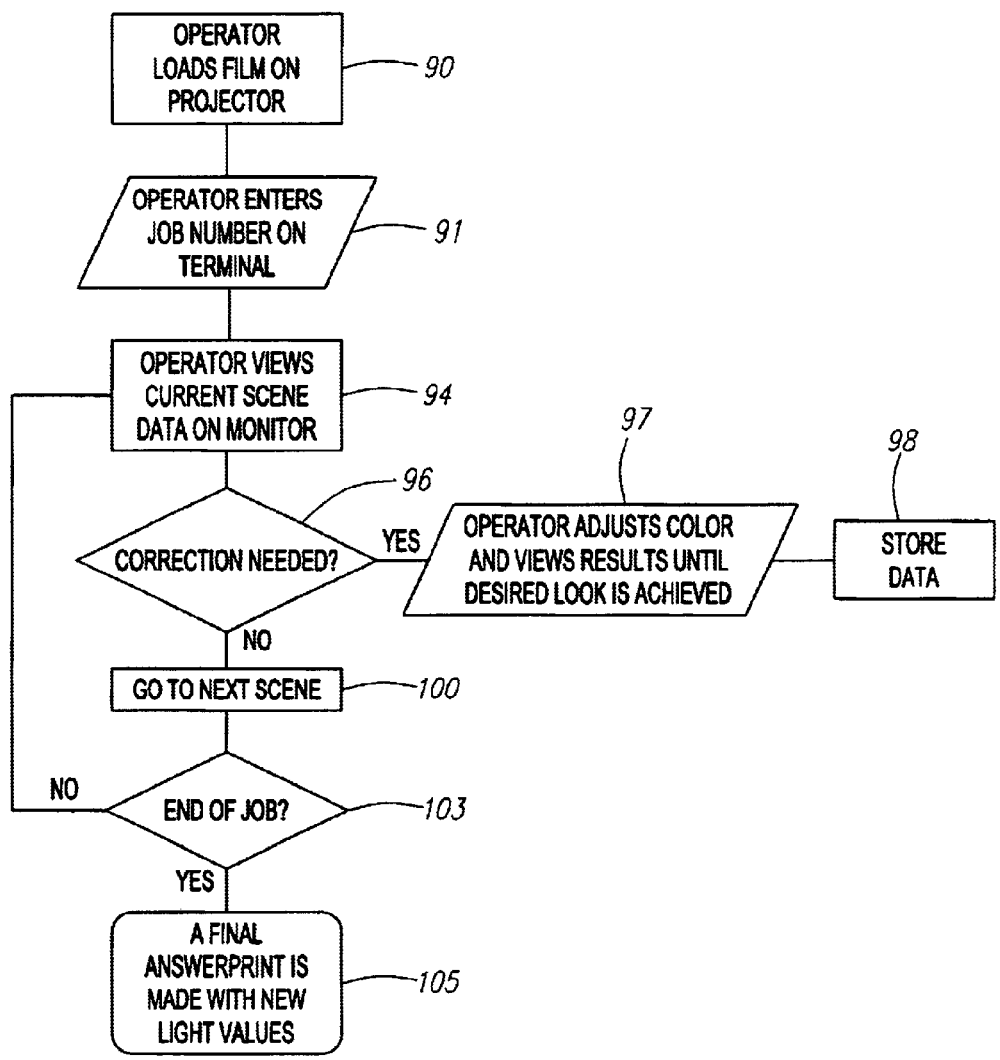
FIG. 3 is a flow chart illustrating the present new method of real time answerprint timing.

FIG. 3 is a flow chart which specifically illustrates the operations performed by the Timer (identified as "operator" in FIG. 3). At 90 the Timer (or operator) loads film on the projector 10 (FIG. 2). At 91 the operator enters the appropriate job number on the computer terminal 20, and then proceeds at 94 to view the current scene as projected on the screen 24 via the projector at 10 (FIG. 2), and the Timer can view any appropriate data on the monitor of the answerprint computer terminal 20 at 96. If correction is needed, the operator makes the appropriate adjustments at 97 and the correction value data is stored as indicated at 98 in the server 21 and the process continues at 100 or if no correction is needed, the Timer proceeds directly at 100 to the next scene, and that scene is viewed at 94 and the correction sequence 96–98 is repeated if it is not the end of the job. If there is no further scene and it is the end of the job 103, then the process proceeds at 105 to make a new answerprint with the new light values as is described below (FIGS. 4–5).

Figure 4:
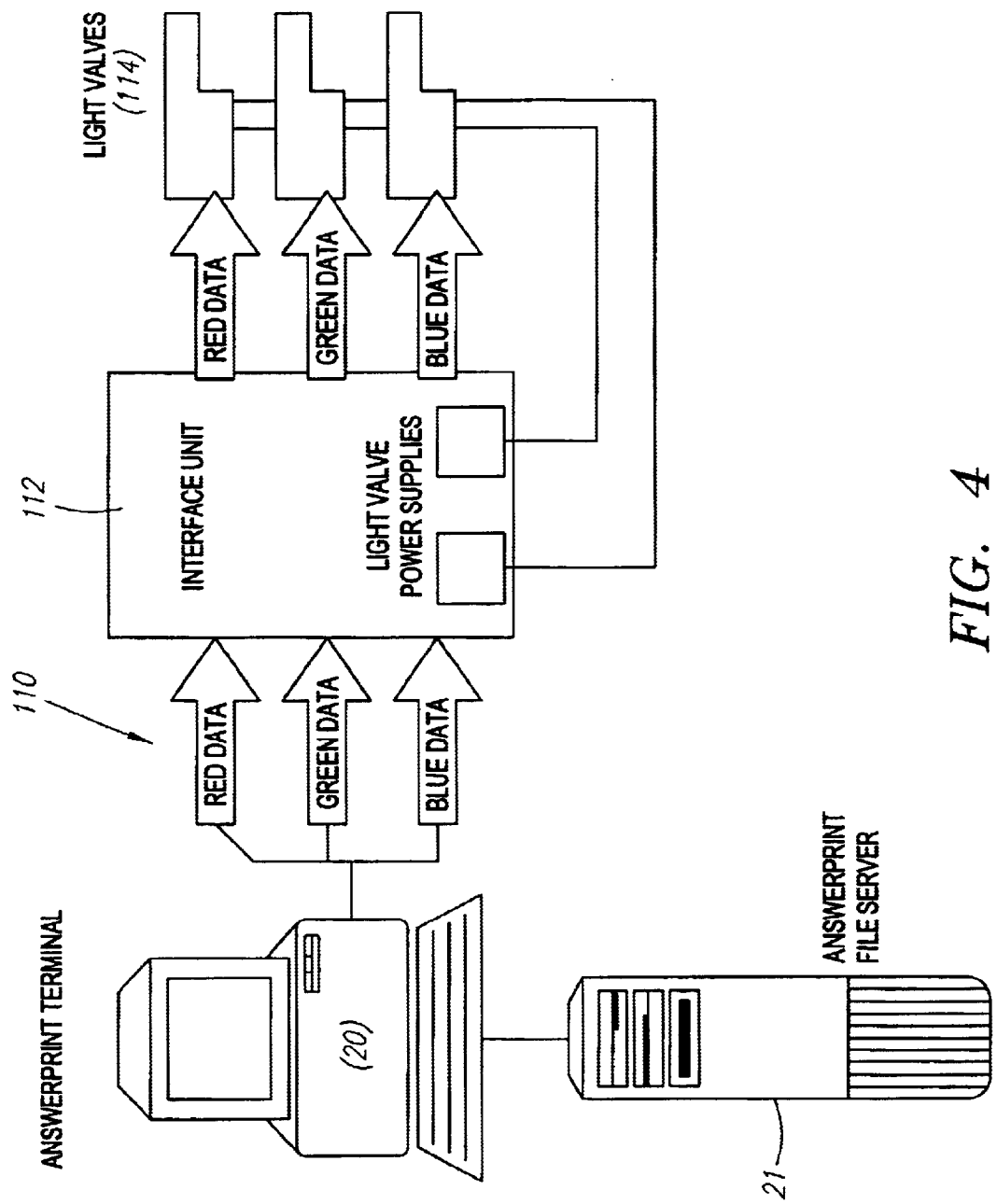
FIG. 4 is a block diagram of an answerprint printing control system.
Figure 5:
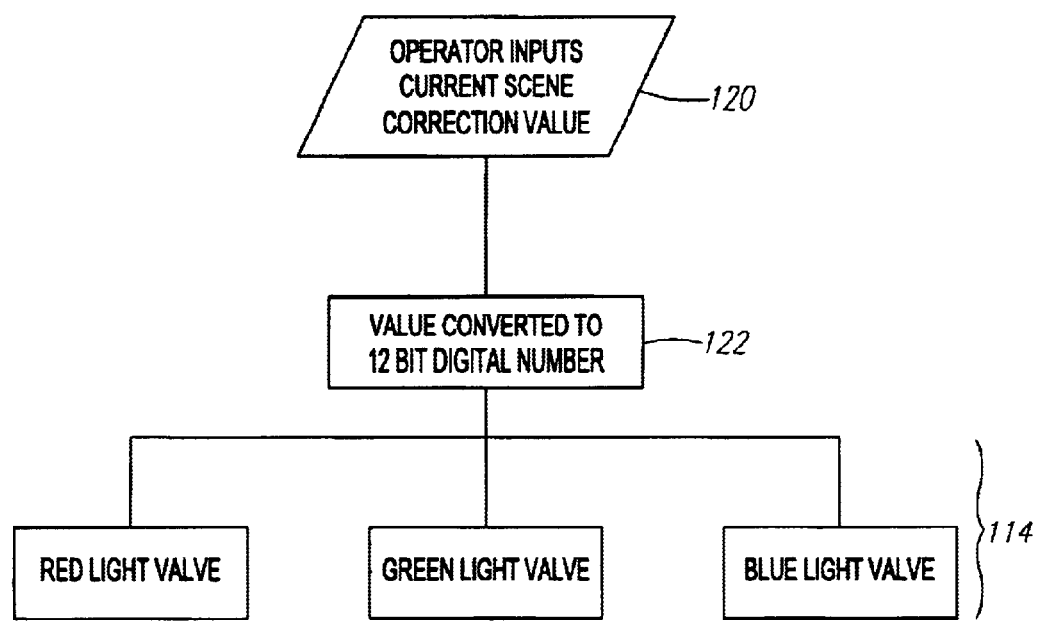
FIG. 5 is a flowchart illustrating control of the light valves of an answerprint printer.

Turning now to FIGS. 4 and 5, these illustrate the respective film printing system under control of the answerprint computer terminal 20 and the steps in the process of the operator inputting the stored correction values for controlling the film printer light values. Thus, FIG. 4 shows the computer 20 which has received, and stored in file server 21, all of the light valve data values for each frame and/or each scene from the interface 16, as well as the film position information from the encoder 18. This information is now provided at 110 to an interface unit 112 which powers and controls the printer light valves 114 of a conventional motion picture film printer. As seen in the flow chart of FIG. 5 the answerprint printer operator inputs current scene and correction values at 120, which is the data which has already been stored, and this data is converted at 122, to a 12 bit digital number as is conventional in a film printer to control the conventional film printer light valves 114. It is desirable that the viewing light control system 12, such as a conventional vane house, be the same as that used for printing so that the light values are consistent from viewing to printing.

While embodiments of the present invention have been shown and described, various modifications may be made without departing from the scope of the present invention, and all such modifications and equivalents are intended to be covered.

What is claimed is:

1. A color correction system for use in correcting the look of a motion picture film scene comprising a source of illumination, a color control unit for receiving light from the source of illumination, the color control unit having a plurality of light valves for allowing individual colors to be varied and incrementally changed to produce a resulting projection beam having selected color levels, a film projector disposed for receiving the resulting beam, the film projector having a motion picture driving system for feeding the motion picture film through the projector and having an optical system for projecting frames of film onto a viewing screen, a film position encoder for detecting film position, a light valve control interface connected to the color control unit for providing control signals for controlling light values thereof in adjusting color levels thereof, and the interface for receiving position data from the encoder, and a terminal for receiving and storing signals from the interface representative of the color levels selected and film position from the encoder, and for enabling this information to be provided to a motion picture film printer for control of color levels in the printer for printing a subsequent film scene.

2. A color correction system as in claim 1 wherein the color control unit comprises a conventional film printer vane house.

3. A color correction system as in claim 1 wherein the color control unit comprises a conventional film printer vane house and the light valves include vanes thereof for controlling the level of light passed thereby.

4. A color correction system as in claim 1 wherein the control unit comprises the plurality of optical valves.

5. A color correction system as in claim 4 wherein the control unit comprises a conventional printer vane house and the optical valves comprise light control vanes.

6. A color correction system for use in correcting color of a motion picture film scene comprising a source of illumination, a color control unit for receiving light from the source of illumination, the color control unit having a plurality of light valves for allowing certain individual colors to be varied to produce a resulting projection beam having selected color levels, a film projector disposed for receiving the resulting beam, the film projector having a motion picture system for feeding the motion picture film through the projector and having an optical system for projecting frames of the film onto a viewing screen, a film position encoder for detecting film position, a light valve control interface connected to the color control unit for providing control signals for controlling light values thereof in adjusting color levels thereof, and a film print computer for receiving signals from the interface representative of the color levels selected and for receiving signals from the film position encoder, and for providing this information to a motion picture film printer to control color levels in the printer for printing a subsequent film scene.

7. A color correction system as in claim 6, wherein the color control unit comprises a conventional film printer vane house and the light valves include vanes thereof for controlling the level of light passed thereby.

8. A color correction system as in claim 6 including a interface unit for receiving control signals from the film print computer and controlling the film printer in printing a film scene.

9. A color correction system for use in modifying a motion picture film scene comprising a source of illumination, a color control unit for receiving light from the source of illumination, and for allowing individual colors to be changed to produce a resulting projection beam having selected color levels, a film projector for receiving the projection beam and for feeding the motion picture film through the projector, the projector having an optical system for projecting frames of film onto a viewing screen, a film position encoder for detecting film position, a control interface connected to the color control unit for providing control signals for controlling light values thereof in adjusting color levels thereof, a terminal for receiving signals from the interface representative of the color levels selected and receiving signals from the encoder representing film position, and for storing this information for subsequent use by a motion picture film printer to control color levels in the printer for printing a modified film scene.

10. A system as in claim 9 wherein the color control unit includes optical devices for varying individual colors.

11. A system as in claim 9 wherein the color control unit comprises a conventional film printer vane house.

12. A system as in claim 9 wherein the color control unit comprises a conventional film printer vane house and the light valves include vanes thereof for controlling the level of light passed thereby.

13. A system as in claim 9 wherein the control unit comprises a conventional printer vane house and the optical devices comprise light control vanes.

14. A system as in claim 9 wherein the color control unit includes dichroic filters.

15. A system as in claim 9 wherein the terminal is connected to a file server for storage of light values, footage information, any special functions, as well as the job number for later recall by the printing department to prepare punched tapes or other media to be used by the printing machines.

16. In a color correction system for use in modifying a motion picture film scene, a realtime answerprint timing method comprising the steps of a. loading a film on a film projector, b. providing a projection beam for the projector wherein the projection beam has selectable color levels, c. projecting a film scene onto a viewing screen, d. viewing the scene and adjusting the selected color levels to vary the look, and storing information representative of the selected color levels, e. viewing another scene and repeating steps b through d until scenes are modified and information concerning color correction therefor is stored.

17. A method as in claim 16 wherein the light is projected by a conventional film printer vane house having a plurality of light valves for allowing individual colors to be varied incrementally and changed to produce the resulting projection beam.

18. A method as in claim 16 including the further step of using the stored color levels to control motion a picture film printer in printing modified film scenes.

\* \* \* \* \*